US005577465A

United States Patent [19]
Cook

[11] Patent Number: 5,577,465
[45] Date of Patent: Nov. 26, 1996

[54] KIT FOR ASSEMBLING AN EXPANDABLE PET ENCLOSURE AND CLIMBING DEVICE

[76] Inventor: Weldon Cook, 30700 Manzano Dr., Malibu, Calif. 90265

[21] Appl. No.: 264,701

[22] Filed: Jun. 23, 1994

[51] Int. Cl.⁶ .............................. A01K 1/02; A01K 1/035
[52] U.S. Cl. .................. 119/498; 119/28.5; 119/706; 482/35
[58] Field of Search ........................... 119/28.5, 19, 705, 119/706, 498, 496, 497, 467, 468, 474; 446/122, 126; 482/35, 36; 135/156; 5/111, 120, 122, 127

[56] References Cited

U.S. PATENT DOCUMENTS

| | | | |
|---|---|---|---|
| 814,367 | 3/1906 | Given | 446/126 |
| 3,595,209 | 7/1971 | Parker | 119/706 |
| 4,497,279 | 2/1985 | Bell | 482/36 |
| 4,790,265 | 12/1988 | Manson | 119/706 |
| 4,793,286 | 12/1988 | Buxton | 119/19 |
| 5,265,557 | 11/1993 | Lovitz | 446/126 |
| 5,310,376 | 5/1994 | Mayuzumi et al. | 446/126 |

FOREIGN PATENT DOCUMENTS 1603603  2/1979  Germany ............................. 446/126

*Primary Examiner*—Todd E. Manahan
*Attorney, Agent, or Firm*—Denton L. Anderson; Sheldon & Mak, Inc.

[57] ABSTRACT

A kit for constructing an expandable pet climbing device is provided. The kit has a set of linear beams, corner members and end caps. The linear beams and the end caps are generally padded with a carpet-like material. The corner members have a body and outwardly-directed prongs disposed at right angles to adjacent prongs. Using the kit of the invention, a pet owner can custom assemble a pet climbing device of any of an infinite variety of shapes and sizes.

20 Claims, 2 Drawing Sheets

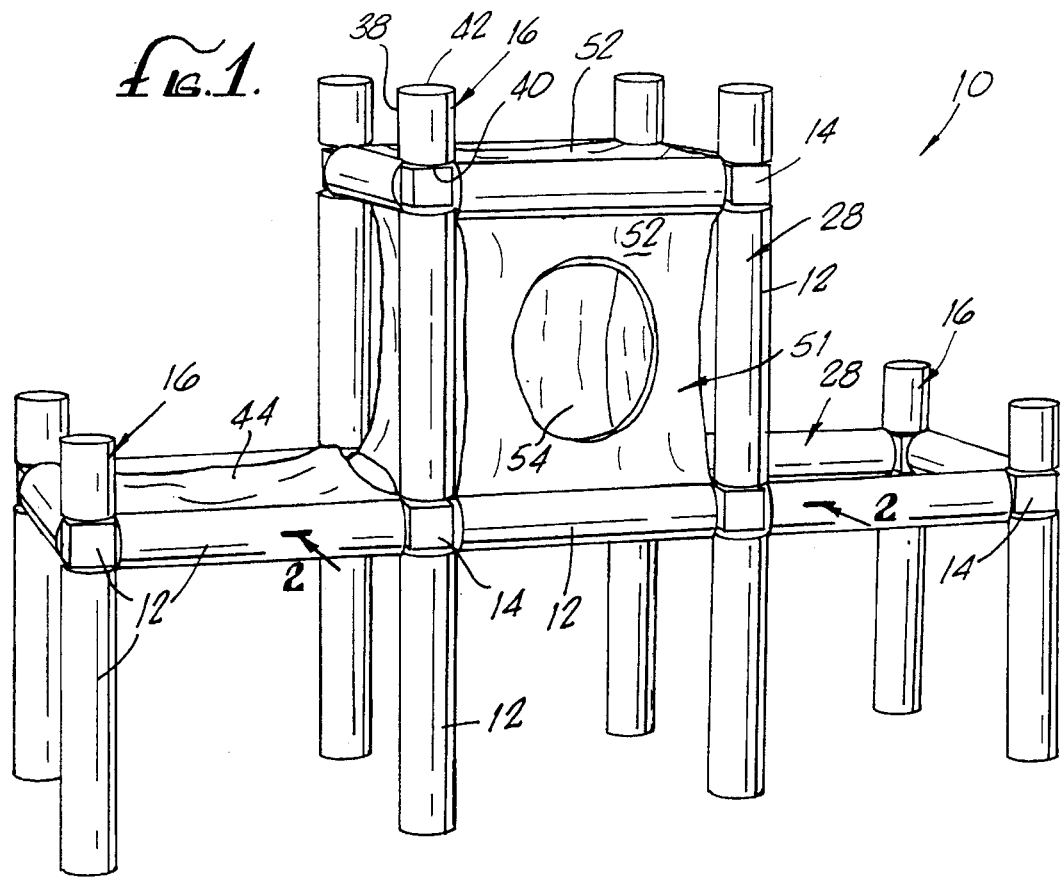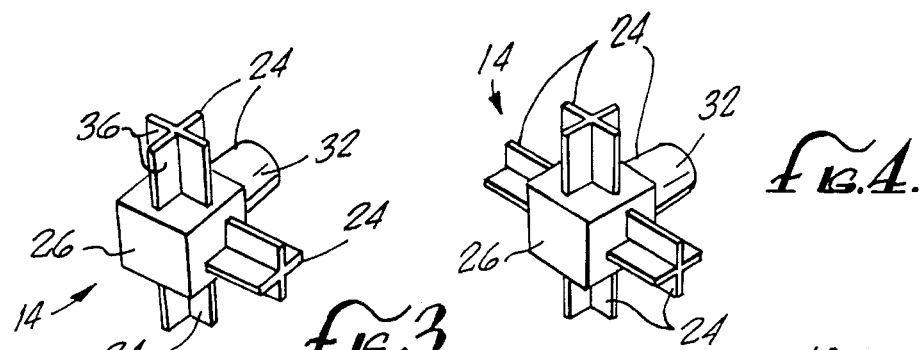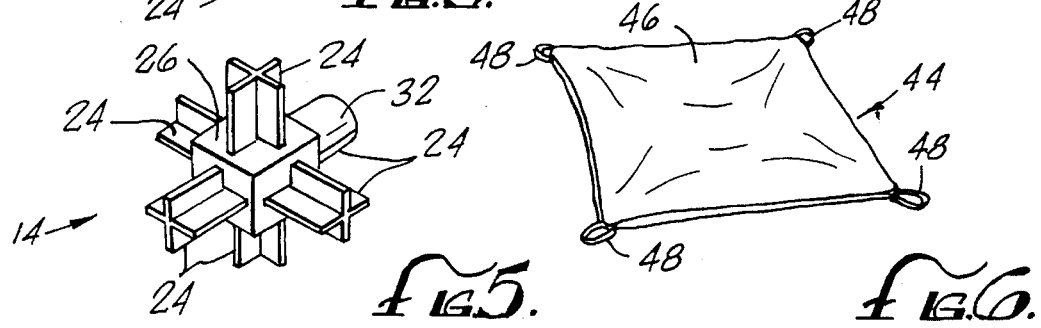

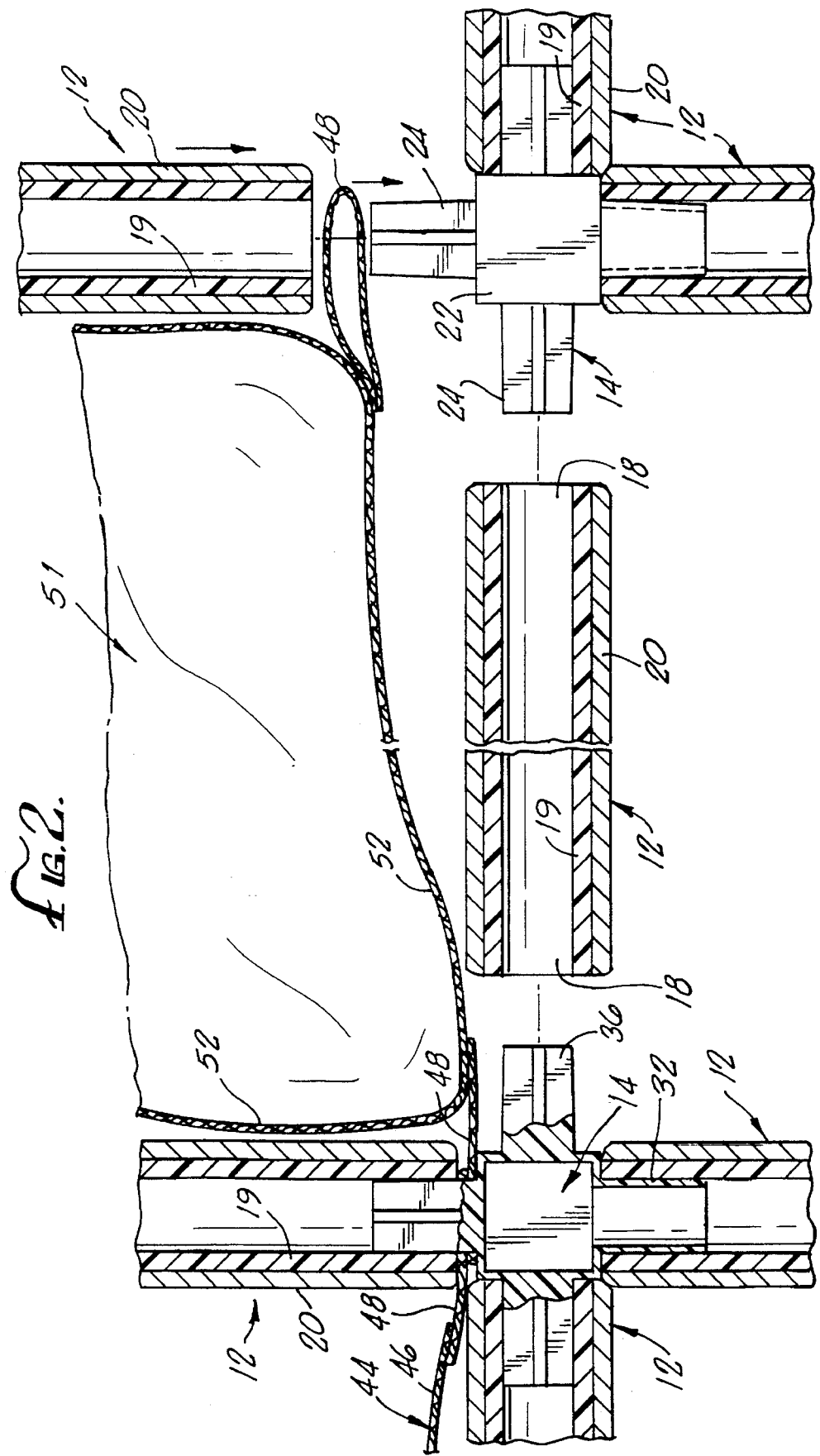

KIT FOR ASSEMBLING AN EXPANDABLE PET ENCLOSURE AND CLIMBING DEVICE

FIELD OF THE INVENTION

This invention relates generally to pet toy devices and specifically to pet climbing devices.

BACKGROUND OF THE INVENTION

Pet climbing devices, especially pet climbing devices designed for kittens, have been popular for many years. These devices are commercially manufactured in a wide variety of shapes and sizes. The smaller devices, however, are relatively uninteresting to the pet after a short period of time. The larger devices are often difficult to fit into the pet owner's living quarters. Custom designing a large pet climbing devices so that it will conveniently fit within the pet owner's living quarters is generally quite expensive.

Accordingly, there is a need for a pet climbing device kit which can be custom assembled by the owner into a wide variety of shapes and which can be readily expanded to fit the needs of the pet owner and the interests of the pet.

SUMMARY OF THE INVENTION

The invention satisfies this need. The invention provides a sturdy and aesthetically pleasing pet climbing device which can be custom assembled by the pet owner into a wide variety of interesting sizes and shapes.

The invention is a kit comprising a plurality of padded beams, a plurality of corner members and a plurality of end caps. The corner members can be constructed with a cubical central body projecting from which, at right angles to one another, are between four and six prongs. The prongs are designed to press fit into openings at the opposite ends of the beams.

The invention can also include a variety of auxiliary equipment, including a pet hammock disposed in a horizontal plane between four corner members and a pet "condo" disposed, for example, within the cubical space defined by the assembly of eight beams of the same length disposed at right angles to adjacent beams.

The invention allows the pet owner to "start small" by purchasing a relatively small number of beams and corner members. The pet owner can then expand the climbing device by purchasing additional beams and corner members. The amount of variation in the construction of the pet climbing device is virtually infinite and depends only upon the resources and creativity of the pet owner. Such a pet climbing device offers unlimited interest to the pet owner's pet, especially pets such as kittens. When and if the pet becomes bored with a particular configuration, the pet owner can reconfigure the device into an interesting new shape. The pet owner does not have to worry about finding room for a preconstructed pet climbing device within the pet owner's living quarters. The pet owner can custom assemble the pet climbing device to specifically match the pet owner's available space.

DESCRIPTION OF DRAWINGS

These and other features, aspects and advantages of the present invention will become better understood with reference to the following description, appended claims and accompanying drawings where:

FIG. 1 is a perspective drawing of a pet climbing device constructed from a kit having features of the invention;

FIG. 2 is a detailed side view in partial cross-section of the kit of FIG. 1, taken along line 2—2;

FIG. 3 is a four-pronged end member useful in the kit of FIG. 1;

FIG. 4 is a five-pronged corner member useful in the kit of FIG. 1;

FIG. 5 is a six-pronged corner member useful in the kit of FIG. 1; and

FIG. 6 is a pet hammock useful in the kit of FIG. 1.

DETAILED DESCRIPTION OF THE INVENTION

The invention is a kit 10 comprises a plurality of beams 12, a plurality of corner members 14 and a plurality of end caps 16.

The beams 12 can be linear or nonlinear. Each beam 12 has a plurality of end openings 18. As shown in the embodiments illustrated in the drawings, the beams 12 are typically linear with an end opening 18 disposed at opposing ends of each beam 12.

In embodiments wherein the beams 12 are linear, the beams 12 can be of various lengths, so long as there is a plurality of beams 12 having the same length. Typically, the beams 12 are of the same length so as to make them interchangeable with one another.

Typically, the beams 12 are linear, having a length of between about five inches and about twelve inches and a thickness between about three quarters inch and two inches. Those of ordinary skill in the art, however, will realize that other sizes are quite possible so long as pet climbing devices constructed from the beams 12 have sufficient strength to handle the size and quantity of the pets who will be using the climbing device.

The beams 12 have a structural member 19 which can be constructed of a wide variety of materials, including metals, woods and plastics. For ease and efficiency of manufacture, the structural members 19 are preferably constructed of an extruded plastic material. Each extruded structural member 19 is a hollow tube having opposing end openings.

The structural members 19 are preferably covered with a fabric 20. Such a covering 20 is appealing to a pet, particularly to a kitten. Most preferably, the structural members 19 are covered with a padded fabric such as a carpet material. Carpet materials are very appealing to pets, especially kittens.

The end openings 18 are typically round, but other shapes can also be used. Preferably, the end openings 18 are all of the same shape for ready interchangeability of the beams. Where the end openings 18 are round, they typically have a diameter between about one quarter inch and about one inch.

Each corner member 14 has a center 22 and a plurality of prongs 24 directed outwardly from the center 22. Each prong 24 is sized and dimensioned to press fit into an end opening 18 in at least one of the beams 12.

In the embodiments illustrated in FIGS. 3–5, the corner members 14 have a body 26 disposed at the center 22 of each corner member 14 and have between four and six prongs 24 radiating outwardly from that body 26. In the embodiment illustrated in the drawings, the prongs 24 are disposed at right angles to adjacent prongs 24 so that the pet climbing device can be constructed of a plurality of square or rectangular planar frame sections 28 wherein each beam 12 is disposed at right angles to an adjacent beams 12 in the same plane. Therefore, as illustrated in FIG. 1, the resulting pet climbing device forms a three-dimensional framework section 30 having a cubic or a three-dimensional rectangular shape defined by eight beams 12 held together by eight corner members 14.

The corner members 14 can all have six prongs 24 as illustrated in FIG. 5. Each such corner member 14 would be adequate in constructing all of the various cubic and rectangular shapes necessary in a typical pet climbing device of the invention. Specialty corner devices 14 having four or five prongs 24 as illustrated in FIGS. 3 and 4, respectively, can alternatively be used to form the perimeter of the pet climbing device. Use of such specialty corner members 24 gives the finished pet climbing device a more finished look as illustrated in FIG. 1.

The prongs 24 do not have to be disposed at right angles with respect to adjacent prongs 24. Other angles can also be used. Corner members 14 wherein the prongs 24 are not disposed at right angles will form pet climbing devices wherein the individual planar frame sections 28 are not square or rectangular in shape. Preferably, however, the angles between adjacent prongs 24 are the same in all corner pieces for easy interchangeability.

As illustrated in FIGS. 3–5, the prongs 24 can be tubular prongs 32 or they can be prongs formed from intersecting plane sections 34. In the embodiments illustrated in FIGS. 3–5, one of the prongs 24 on each corner member 14 is tubular 32 and the other prongs 24 are constructed of a pair of intersecting rectangular planar sections 36 wherein the planar sections 36 bisect one another at right angles. Additional planar sections 36 can be used, but are generally not necessary.

Regardless of whether the prongs 24 are tubular-shaped or constructed of planar sections 36, it is preferable that the prongs 24 taper slightly as they extend away from the center 22 of the corner member 14. Such tapering makes it easier to press fit the prong 24 into the end openings 18 of the beams 12.

In the embodiments illustrated in the drawings, the body 26 of each of the corner members 14 is cube-shaped with between four and six prongs 24 extending outwardly from each of the six faces of the body 22.

For ease of manufacture, it is preferable that the body 22 be hollow and that the tubular-shaped prong 32 also be hollow and in fluid communication with the hollow interior of the body 22. This configuration allows the corner members 14 to be easily and efficiently manufactured by typical plastic extrusion methods.

The length of the prongs 24 is not critical, so long as each prong 24 is long enough to effectively form a relatively rigid press fit within the end openings 18 of the beams 12. Typically, the prongs 24 are between about one half inch and about one and a half inches in length.

The end caps 16 are typically used to top off the exposed prongs 24 on the pet climbing device. In the embodiment illustrated in FIG. 1, the end caps 16 are used only to cap upwardly directed prongs 24. However, it can readily be recognized that end caps 16 can be used to cover laterally-directed prongs 24 as well.

Each end cap 16 has a body 38, an end opening 40 and an end wall 42 disposed opposite the end opening 40. Each end cap end opening 40 is sized and dimensioned to press fit over a prong 24 of at least of the corner members 14. Preferably, the end cap openings 40 are all of the same shape so as to make the end caps 16 readily interchangeable.

The end caps 16 are typically constructed of the same materials and in the same way as the beams 12. The end caps 16 are typically covered with the same material which is used to cover the beams 12. This gives the finished pet climbing device an aesthetically pleasing look. The length of the end caps 16 is not critical, but typically they will be between about one inch and about three inches in length.

The invention can also comprise one or more pet hammocks 44 as illustrated in FIG. 6. Each pet hammock 44 is constructed of a sheet of flexible material 46 such as a soft fabric. Prong attachment fasteners 48 are disposed around the periphery of the flexible material 46. Each prong attachment fastener 48 is sized and dimensioned to attach to a corner member prong 24. In the embodiments illustrated in the drawings, the beams 12 are of substantially the same length, so that each of the horizontal planar frame sections 28 is a square. Accordingly, the pet hammock 44 comprises a section of square flexible material 46 sized and dimensioned to fit within the area defined by a horizontal planar frame section 28. The prong attachment fasteners 48 are provided by four loops disposed at each of the four corners 50. Each of the loops is sized and dimensioned to slip over the upwardly-directed prongs 24 at each of the four corners of the horizontal planar frame section 28.

The invention can also comprise one or more pet condos 51 as illustrated in FIG. 1. Each pet condo 51 is constructed of a flexible material such as a soft fabric. Prong attachment fasteners 48 are disposed around the periphery of the pet condo walls. Each prong attachment fastener 48 is sized and dimensioned to attach to a corner member prong 24. In the embodiments illustrated in the drawings, the beams 12 are of substantially the same length, so that each of the three-dimensional framework sections 30 is cubical in shape. Accordingly, the pet condo 51 has a cubical shape, being made up of six square sides 52. Prong attachment fasteners 48 are provided at each of the upper four corners and each of the lower four corners. The pet condo 51 has an opening 54 through which a pet can pass into and out of the pet condo 51.

Although the present invention has been described in considerable detail with reference to certain preferred versions, many other versions should be apparent to those skilled in the art. Therefore, the spirit and scope of the appending claims should not necessarily be limited to the description of the preferred versions contained herein.

What is claimed is:

1. A kit for constructing an expandable pet climbing device comprising:

(a) a plurality of beams, each beam having a body with an opening at each end;

(b) a plurality of corner members, each corner member having a center and a plurality of prongs directed outwardly from the center, each prong being sized and dimensioned to press fit into an end opening in at least one of the beams, wherein the corner members are capable of connecting the beams to one another to form a three dimensional framework;

(c) a plurality of end caps, each end cap having a body, an end opening and an end wall disposed opposite the end opening, wherein the end opening in each end cap is sized and dimensioned to press fit over a prong on at least one of the corner members;

(d) a sheet of flexible material, sized and dimensioned to fit within the area enclosed by a plurality of beams connected to one another by corner members to create a continuous horizontal perimeter; and (e) a plurality of prong attachment fasteners disposed around the periphery of the flexible sheet, each prong attachment fastener being sized and dimensioned to attach to one of the corner members.

2. The kit of claim 1 wherein the body of each beam is padded.

3. The kit of claim 1 wherein the beams are covered with a fabric.

4. The kit of claim 1 wherein the beams are covered with a carpet.

5. The kit of claim 1 wherein one of the prongs on each of the corner members is a hollow tube with a distal end opening and wherein the center of each corner member comprises a hollow body which is in fluid communication with the hollow tube.

6. The kit of claim 1 wherein each corner member has a body disposed at its center.

7. The kit of claim 6 wherein the body is substantially a cube having three pairs of opposing faces.

8. The kit of claim 1 wherein each corner member has at least four prongs disposed at right angles with respect to one another.

9. The kit of claim 1 wherein at least one of the prongs on each of the corner members comprises intersecting rectangular planar sections.

10. The kit of claim 9 wherein the edges of each planar section taper as the prong extends away from the center of the corner member.

11. A kit for constructing an expandable pet climbing device comprising:

(a) a plurality of beams, each beam having a body with an opening at each end;

(b) a plurality of corner members, each corner member having a center and a plurality of prongs directed outwardly from the center, each prong being sized and dimensioned to press fit into an end opening in at least one of the beams, wherein the corner members are capable of connecting the beams to one another to form a three dimensional framework;

(c) a plurality of end caps, each end cap having a body, an end opening and an end wall disposed opposite the end opening, wherein the end opening in each end cap is sized and dimensioned to press fit over a prong on at least one of the corner members;

(d) a hollow compartment composed of a flexible material, the compartment being sized and dimensioned to fit within the volume enclosed by a plurality of beams connected to one another by corner members to create an enclosed volume; and (e) a plurality of prong attachment fasteners disposed around the periphery of the hollow chamber, each prong attachment fastener being sized and dimensioned to attach to one of the corner members.

12. The kit of claim 11 wherein the body of each beam is padded.

13. The kit of claim 11 wherein the beams are covered with a fabric.

14. The kit of claim 11 wherein the beams are covered with a carpet.

15. The kit of claim 11 wherein each corner member has a body disposed at its center.

16. The kit of claim 15 wherein the body is substantially a cube having three pairs of opposing faces.

17. The kit of claim 11 wherein each corner member has at least four prongs disposed at right angles with respect to one another.

18. The kit of claim 11 wherein at least one of the prongs on each of the corner members comprises intersecting rectangular planar sections.

19. The kit of claim 18 wherein the edges of each planar section taper as the prong extends away from the center of the corner member.

20. The kit of claim 11 wherein one of the prongs on each of the corner members is a hollow tube with a distal end opening and wherein the center of each corner member comprises a hollow body which is in fluid communication with the hollow tube.

\* \* \* \* \*